US009338160B2

(12) United States Patent
Matthews et al.

(10) Patent No.: US 9,338,160 B2
(45) Date of Patent: May 10, 2016

(54) CERTIFICATE CHECKIN SERVICE

(71) Applicant: Red Hat, Inc., Raleigh, NC (US)

(72) Inventors: John Matthews, Wake Forest, NC (US); Wes Hayutin, Raleigh, NC (US); Christopher Duryee, Durham, NC (US); James Slagle, Raleigh, NC (US); Chris Morgan, Raleigh, NC (US); Todd Sanders, Clayton, NC (US)

(73) Assignee: Red Hat, Inc., Raleigh, NC (US)

( * ) Notice: Subject to any disclaimer, the term of this patent is extended or adjusted under 35 U.S.C. 154(b) by 245 days.

(21) Appl. No.: 13/961,495

(22) Filed: Aug. 7, 2013

(65) Prior Publication Data

US 2015/0047058 A1 Feb. 12, 2015

(51) Int. Cl.
H04L 29/00 (2006.01)
H04L 29/06 (2006.01)

(52) U.S. Cl.
CPC ............ H04L 63/0823 (2013.01); H04L 63/10 (2013.01)

(58) Field of Classification Search
CPC .......................... H04L 63/10; H04L 63/0823
See application file for complete search history.

(56) References Cited

U.S. PATENT DOCUMENTS

| 2004/0148505 | A1* | 7/2004 | Qiu | G06F 21/33 713/175 |
| 2011/0191477 | A1* | 8/2011 | Zhang et al. | 709/226 |
| 2011/0213687 | A1* | 9/2011 | Ferris | G06Q 30/04 705/34 |
| 2011/0213691 | A1* | 9/2011 | Ferris | G06F 9/44505 705/37 |
| 2011/0214124 | A1* | 9/2011 | Ferris | G06F 8/63 718/1 |
| 2011/0295727 | A1* | 12/2011 | Ferris | G06F 11/34 705/34 |
| 2011/0296022 | A1* | 12/2011 | Ferris | G06F 9/5072 709/226 |
| 2012/0130873 | A1* | 5/2012 | Morgan | G06Q 30/04 705/34 |
| 2012/0131194 | A1* | 5/2012 | Morgan | G06F 9/5072 709/226 |
| 2012/0131195 | A1* | 5/2012 | Morgan | G06F 9/5072 709/226 |
| 2012/0226808 | A1* | 9/2012 | Morgan | 709/226 |
| 2013/0191923 | A1* | 7/2013 | Abuelsaad et al. | 726/26 |

* cited by examiner

Primary Examiner — Michael Pyzocha
(74) Attorney, Agent, or Firm — Lowenstein Sandler LLP

(57) ABSTRACT

A method and system for a content provider to enable the consumption of content by properly entitled consumers (e.g., end-users, clients, customers) within a cloud provider network. A first certificate checkin service (CCS) executed by a processing device deployed in the cloud provider network receives a first set of usage data relating to content of a content provider consumed by a client of the cloud provider network. The first CCS provides the usage data to a communicatively coupled parent CCS. The first CCS provides the parent CCS with a request for entitlement data relating to the cloud provider, and stores the entitlement data received from the parent CCS. The entitlement data may be used by the first CCS to determine if the client is entitled to consume the content.

17 Claims, 4 Drawing Sheets

US 9,338,160 B2

CERTIFICATE CHECKIN SERVICE

TECHNICAL FIELD

Embodiments of the present disclosure relate to distribution of content, and more specifically, to a method and system for synchronizing authorization, authentication and entitlement data across a network to enable consumption of content by cloud providers.

BACKGROUND

A content provider makes content (e.g. software) available to a cloud provider for provisioning within the cloud provider's private and/or public clouds for consumption by the cloud provider's end users. The content provider and cloud provider may partner with one another by establishing a contract (e.g., a license) to govern the use of the content by the cloud provider's end users. To avoid use of the content without proper entitlement, the content provider should confirm that consumption of the content by the cloud provider's end users complies with the entitlement parameters set forth in the agreement with the cloud provider.

DETAILED DESCRIPTION

Figure 1:
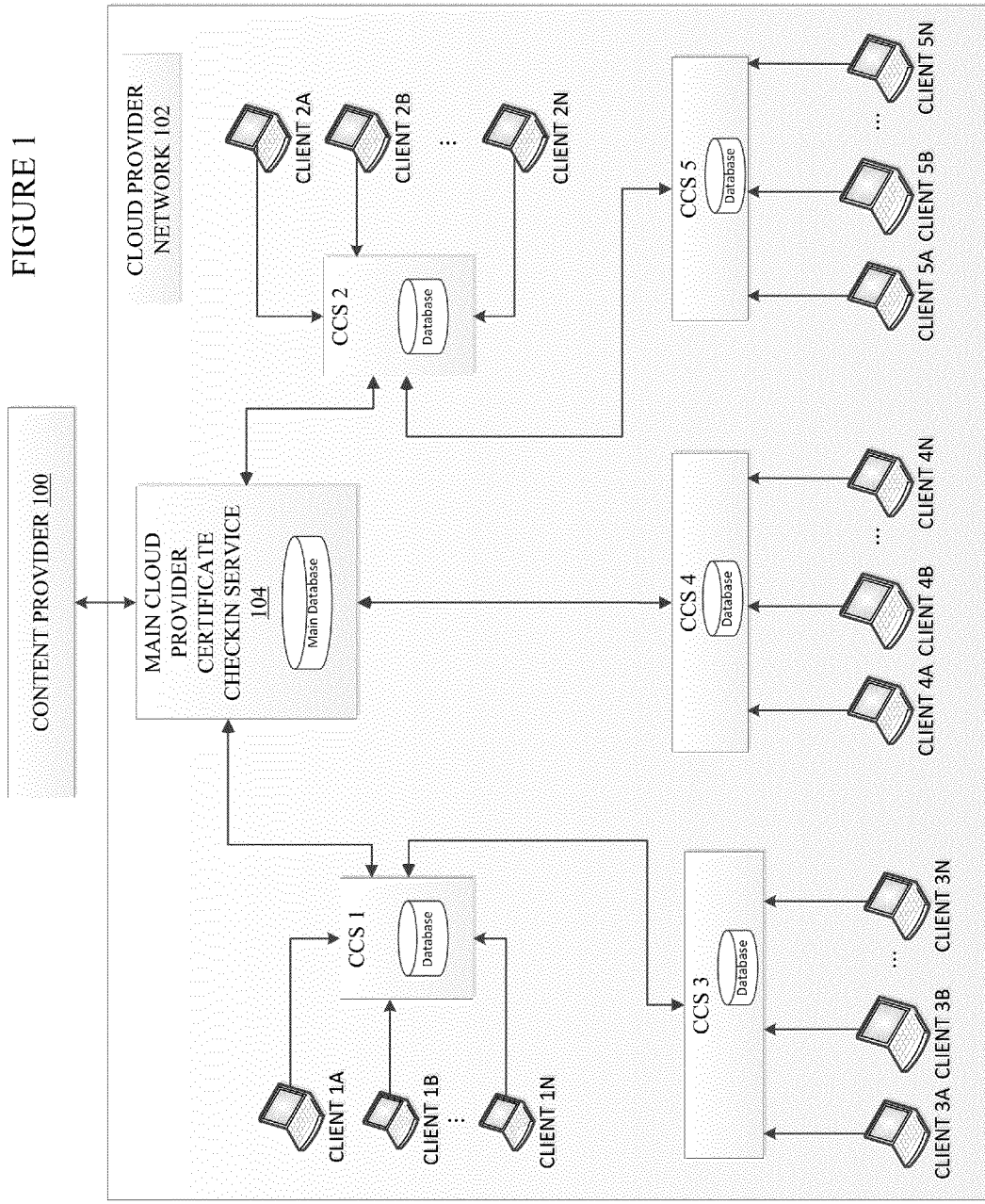
FIG. 1 is a block diagram of an example system for managing consumption of content in a cloud provider network, according to aspects of the present disclosure.

In a computing environment including the provisioning of content to a cloud provider, it may be desired for the content provider to enable the consumption of content by properly entitled users (also referred to as customers and/or consumers) within the cloud provider's network. In a conventional system, there is typically a lack of synchronization of data between the cloud provider and the content provider. For example, there is no mechanism to properly entitle consumers of the content. Since the tracking of entitlement is usually lacking within the cloud, a cloud provider (also referred to as a cloud partner) can enable content for all customers in the cloud network. Furthermore, conventional systems generally lack a mechanism to track the usage of the content by the customers in the cloud provider's network and report the usage information to the content provider.

The present disclosure relates to content delivery management methods and systems that provide for the efficient synchronization of entitlement data and usage data between a cloud provider and a content provider. According to aspects of the present disclosure, the entitlement data may include any information employed to authenticate and/or authorize an entity (e.g., a client, user, consumer, system, etc.) is properly entitled to access content, such as, for example, an SSL certificate used to access content from a software download repository via HTTPS. According to aspects of the present disclosure, the usage data may include any information or data relating to the use and/or consumption of content (e.g., a software program) by an entity (e.g., a client, user, consumer, system, etc.), such as, for example, a "checkin" record that tracks consumption of an entitlement certificate. The content provider synchronizes entitlement data for use in determining whether an end user is entitled to consume content in accordance with an underlying agreement (e.g., a license, subscription, contract, etc.) between the content provide and the cloud provider. In addition, usage data relating to the consumption of the content by the multiple end users of the cloud provider is collected and provided to the content provider for use in managing compliance with the underlying agreement.

In an embodiment, the present disclosure relates to a web-based system including a network of services (herein referred to as certificate checkin services) for synchronizing entitlement data (e.g., authorization data, authentication data) and content consumption data (also referred to as usage data) to enable consumption of content in a cloud managed by a cloud provider. The multiple certificate checkin services (CCSs) may be executed by a computing device (e.g., server) and collect usage data and provision entitlement data to a portion or segment of the cloud provider's network. Advantageously, a cloud provider having multiple network segments (e.g., private and/or public network segments) may deploy a certificate checkin service (CCS) in association with each segment in order to manage the entitlement and usage data.

The multiple CCSs may be arranged to share and distribute the entitlement and usage data with one another to enable exchange of the data with a main CCS associated with the cloud provider. Advantageously, the main CCS associated with the cloud provider may communicate with the content provider in order to provide updates regarding the content usage associated with the end-users of the cloud network and retrieve entitlement data from the content provider for distribution to the CCS network.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram illustrating an example computing environment including a content provider 100 in communication with a cloud provider network 102 via a network (e.g., a public network such as the Internet, a private network such as a local area network (LAN), or a virtual private network (VPN)). The content provider 100 may include any suitable computing system comprising one or more processors, one or more memory devices, and one or more input/output (I/O) interfaces, such as a server, a workstation, a personal computer (PC), a mobile phone, a palm-sized computing device, a personal digital assistant (PDA), a virtual computing system, etc. In certain implementations, the cloud provider network 102 may comprise physical servers and/or virtual machines, raw and file-based storage, firewalls, load balancers, IP addresses, virtual local area networks (VLANs), wide area network (WAN) connectivity, and/or software products configured to provide content from the content provider 100 to multiple end-users of the cloud operating via clients (e.g., Client 1A, Client 1B, Client 1N, etc. in FIG. 1).

In certain implementations, the content managed in accordance with one or more aspects of this disclosure may include executable files, binary data, documents, media content files, and/or binary data streams. In an illustrative example, the content may include digital content relating to one or more software products, such as, one or more software packages (e.g., one or more primary software packages and optional associated packages containing software dependencies (e.g., drivers, middleware, etc.)).

In an implementation, multiple certificate checkin services (CCSs), such as, CCS 1, CCS 2, CCS 3, CCS 4, and CCS 5 are distributed throughout the cloud provider network 102 in communication with multiple groups or sets of clients within cloud network segments of the cloud provider network 102. The CCSs are further configured to ultimately communicate (either directly or via a parent CCS, as described below) to a main cloud provider CCS 104, which in turn communicates with the cloud provider 100 to exchange entitlement data and usage data. In an implementation, the content provider 100 may include a top-level CCS executing at the public customer or end-user portal.

In an implementation, the entitlement data includes, but is not limited to, information identifying a certificate associated with an agreement between the content provider 100 and the cloud provider governing the use of content (e.g., software assets) by one or more client computer systems in the cloud provider network 102. The agreement (e.g., a subscription, license, contract, etc.) establishes relationships between the content provided by the content provider 100 (e.g., one or more digital content items such as software products, executable and/or non-executable files) and the one or more clients of the cloud provider 102 which consume the content (e.g., by executing the software products), by specifying entitlements of the cloud provider 102 and associated client computer systems to consume the digital content. For example, the entitlement data may specify a number of end-users, servers and/or processors licensed to consume the content, an entitlement period of time (e.g., a time period over which the content is licensed to be consumed under the subscription, or the license expiration date), etc. In an implementation, the entitlement data may further specify other information related to the content, including, e.g., architectures that the digital content is available for, support levels for the digital content, content repositories on which the digital content may be accessed, etc.

In an implementation, the content provider 100 may maintain an inventory of subscriptions available to the cloud provider 102. In an example, when a new managed client computer system is registered with the content provider 100, or a new subscription is added to the inventory of subscription, the content provider 100 may issue a content certificate to the client computer system, and store associated entitlement data in one or more CCSs (e.g., CCS 1, the main cloud provider CCS 104, etc.) The content certificate and entitlement data may serve as a proof of entitlement of the client computer system to consume the content under the subscription.

In an implementation, the usage data refers to information relating to the consumption of the content provider's 100 content by the one or more client computer systems of the cloud provider network 102. For example, the usage data may include a number of end-users in the cloud provider network 102 which are consuming the content provider's 100 content, an identification of which end-users are consuming the content, a number of instances of client computing systems which are consuming the content, an amount of time that the instance of client computing systems were consuming the content, any suitable data which relates to an aspect, condition, limitation, or right granted in the underlying subscription or agreement governing the consumption of the content by the cloud provider network 102, etc.

In an implementation, multiple CCSs are arranged in a parent-child hierarchy, wherein a parent CCS includes an "upstream" CCS with which a "downstream" CCS communicates. For example, as shown in FIG. 1, CCS 1 is configured as a parent to CCS 3, and CCS 2 is configured as a parent to CCS 5. As shown in FIG. 1, CCS 1 and CCS 2 are downstream children of the main cloud provider CCS 104. In an implementation, each parent-child CCS pair communicates to perform the synchronization tasks (i.e., synchronize the entitlement data and the usage data). According to at least one aspect of the present disclosure, entitlement data associated with one or more client computing systems may be stored in a database of a parent CCS (e.g., the entitlement data for Client 3B may be stored in the database for CCS 1) for retrieval by a child CCS (e.g., CCS 3), without having to communicate further upstream to the either the main cloud provider CCS 104 or the content provider 100. According to aspects of the present disclosure, the database may be any suitable computer-readable memory, such as, for example, a MongoDB document database.

In an implementation, a child CCS may be associated with one or more backup parent CCSs that may be communicated with in the event a primary parent CCS is unavailable or unreachable. In this implementation, if an attempt by the child CCS attempts to communicate with a primary parent CCS fails, the child CCS may attempt to contact the backup parent CCS.

With each CCS deployed in the cloud provider network 102 implementing the synchronization tasks and associated API, the CCSs communicate within the parent-child hierarchy to propagate entitlement data (ultimately maintained by the content provider 100) downstream to the appropriate CCS. Furthermore, the usage data relating to the client computing systems identified by an associated CCS is propagated upstream via one or more parent CCSs to the content provider 100. As shown in FIG. 1, the CCSs may include a database for storing the entitlement data and usage data that is collected from one or more client computer systems, one or more child CCSs, and one or more parent CCSs. Advantageously, by synchronizing the entitlement data and the usage data between the cloud provider network 102 and the content provider 100, the cloud provider network 102 is able to serve the content provider's content within the cloud to properly entitled end-users (e.g., customers).

In accordance with one or more aspects of the present disclosure, each CCS includes a tasking and scheduling subsystem (e.g., the Celery task queue) executing a process (e.g., a daemon process) configured to implement tasks including the entitlement data synchronization and the usage data synchronization. In an implementation, the CCS further includes an application programming interface (API), such as a REST-based API, configured to communicate with the other CCSs in the cloud provider network 102 in order to synchronize the entitlement and usage data.

In an implementation, the CCS may be configured to act as both a client (e.g., a child CCS configured to receive entitlement data from a parent CCS and/or usage data from its own child CCS) and a server (e.g., a parent CCS configured to send entitlement data to a child CCS). In this regard, the CCS may be configured to operate in a client mode, a server mode, or both simultaneously. Advantageously, a scalable network of CCSs of any desired size and configuration may be deployed to support a cloud provider network 102 having a complex arrangement of public and private network segments, wherein one or more CCSs may be deployed in each network segment.

In an illustrative example, the cloud provider network 102 may comprise multiple public and/or private cloud network segments (e.g., the cloud network segment associated with Clients 1A, 1B, . . . 1N; the cloud network segment associated with Clients 2A, 2B, . . . 2N; etc.) in communication with a network of CCSs (executing on a suitable computing system, such as a server). In an implementation, one or more CCSs may be in communication with each cloud network segment. For example, as shown in FIG. 1, CCS 1 communicates with Clients 1A, 1B, . . . 1N, CCS 2 communicates with Client 2A, 2B, . . . 2N, and so on.

The various components of the content provider 100 host computing system 100 may reside on different computing devices and may be physically or virtually located in any number of different locations. Accordingly, any desired distributed arrangement of the host computing system 100 may be achieved.

Figure 2:
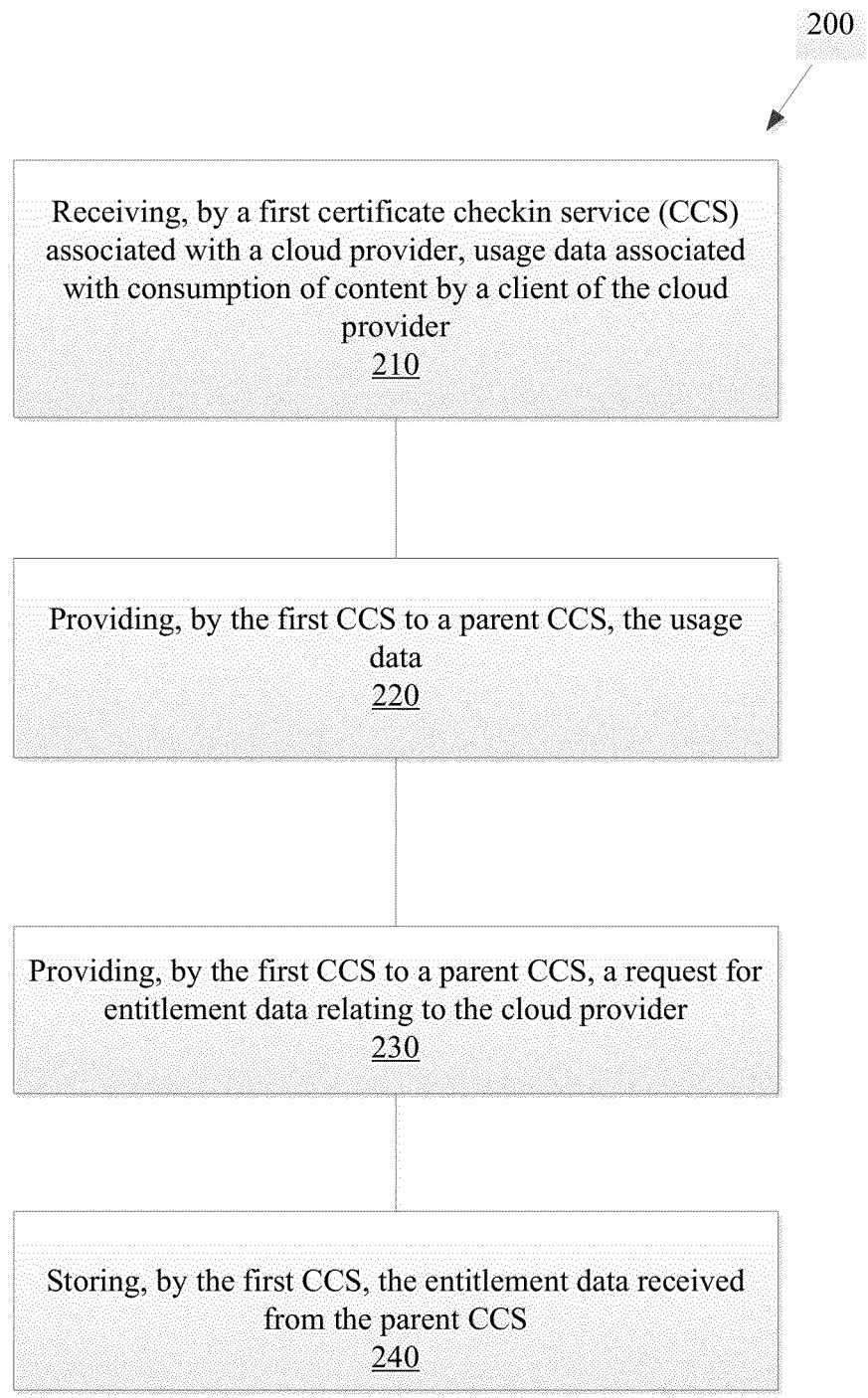
FIG. 2 is a flow diagram of an example method for synchronizing entitlement data and tracking usage data in a cloud provider network, according to aspects of the present disclosure.

FIG. 2 is a flow diagram illustrating an example of a method 200 relating to the synchronizing of entitlement data and usage data in a cloud provider network including multiple CCSs. In an example, the method 200 may be performed by a CCS running on a suitable computing system that may include hardware (e.g., circuitry, dedicated logic, programmable logic, microcode, etc.), software (e.g., instructions executed by a processing device), or a combination thereof.

In block 210, a first CCS associated with a content provider (e.g., CCS 1 in FIG. 1), deployed within a cloud provider network, receives usage data associated with consumption of a content provider's content from one or more associated clients (e.g., Client 1A, Client 1B, and/or Client 1N) and/or one or more downstream CCSs. In an implementation, the first CCS may store the collected usage data relating to the one or more client computing systems in the associated cloud provider network segment in an associated database.

In block 220, the first CCS provides the collected usage data to one or more communicatively coupled parent CCSs. In an implementation, the first CCS (e.g., a child CCS) synchronizes the usage data to the one or more parent CCSs via an HTTP POST request. In an implementation, the upstream propagation of the usage data from the first CCS (e.g., a child CCS) to the one or more associated parent CCSs may be performed periodically according to a predefined schedule or upon the receipt of the usage data from the client computing system and/or a downstream child CCS. In an implementation, a cloud provider network may include a top-level CCS (e.g., the main cloud provider CCS 104 in FIG. 1) configured to receive sets of usage data from all downstream CCSs in the cloud provider network and provide the aggregated usage data to the content provider.

In an implementation, the usage data may include information identifying the content (e.g., software products, digital content, etc.) that was consumed, the identity of the consumer (e.g., the end-user and/or the client computing system) including hardware information about the client computing system (e.g., the cloud instance), etc.

In block 230, the first CCS sends to one or more parent CCSs an entitlement data request relating to the cloud provider network. In an implementation, the entitlement data request (also referred to as an entitlement data lookup) includes a request for the entitlement data associated with one or more cloud instances and/or end-users in the cloud provider network. In block 240, in response to the request, the first CCS receives entitlement data from the parent CCS. According to one or more aspects of the present disclosure, the parent CCS retrieves the entitlement data from one or more of it's own parent CCSs (such as, for example, the main cloud provider CCS) or the content provider. In an implementation, the entitlement data request emanating from the first CCS (e.g., the child CCS) is propagated upstream to the first parent CCS in the associated CCS chain which is storing the associated entitlement data.

In an implementation, the first CCS periodically contacts one or more parent CCSs, according to a pre-defined schedule in order to retrieve the entitlement data stored on the parent CCS. In an implementation, the first CCS sends an HTTP request to the REST API of the parent CCS using an HTTP GET method. In response, the parent CCS provides the entitlement data to the first CCS in any suitable format, such as, for example, in the JSON format. The first CCS may then store the entitlement in its associated database. In an implementation, the request for entitlement data from the first CCS may request the entitlement data that was modified after a certain date in order to identify only updates to the entitlement data. In another implementation, the request for entitlement data from the first CCS may request the entitlement data that has been deleted by the parent CCS so that the first CCS may remove its entitlement data that is no longer valid. In another implementation, the request for entitlement data from the first CCS may identify one or more particular sets of entitlement data (e.g., an entitlement data file associated with a particular end-user or a particular client computing system) by querying the parent CCS's API with a identifier that is unique to the desired entitlement data set.

In block 240, the entitlement data is stored in a database associated with the first CCS. In an implementation, the first CCS may use the stored entitlement data to properly entitle the associated the consumers (i.e., the end-users and/or client computing systems) of the content. Advantageously, employing the parent-child hierarchy of communicatively connected CCSs allows for the efficient retrieval of entitlement data by a CCS managing entitlement for the consumers within a network segment of the cloud provider network. In addition, the parent-child hierarchy of CCSs also provides for a chain of CCS configured to report aggregated usage data back via one or more parent CCSs for ultimate reporting to the content provider for use in monitoring and managing the associated content provider-cloud provider agreement.

Figure 3:
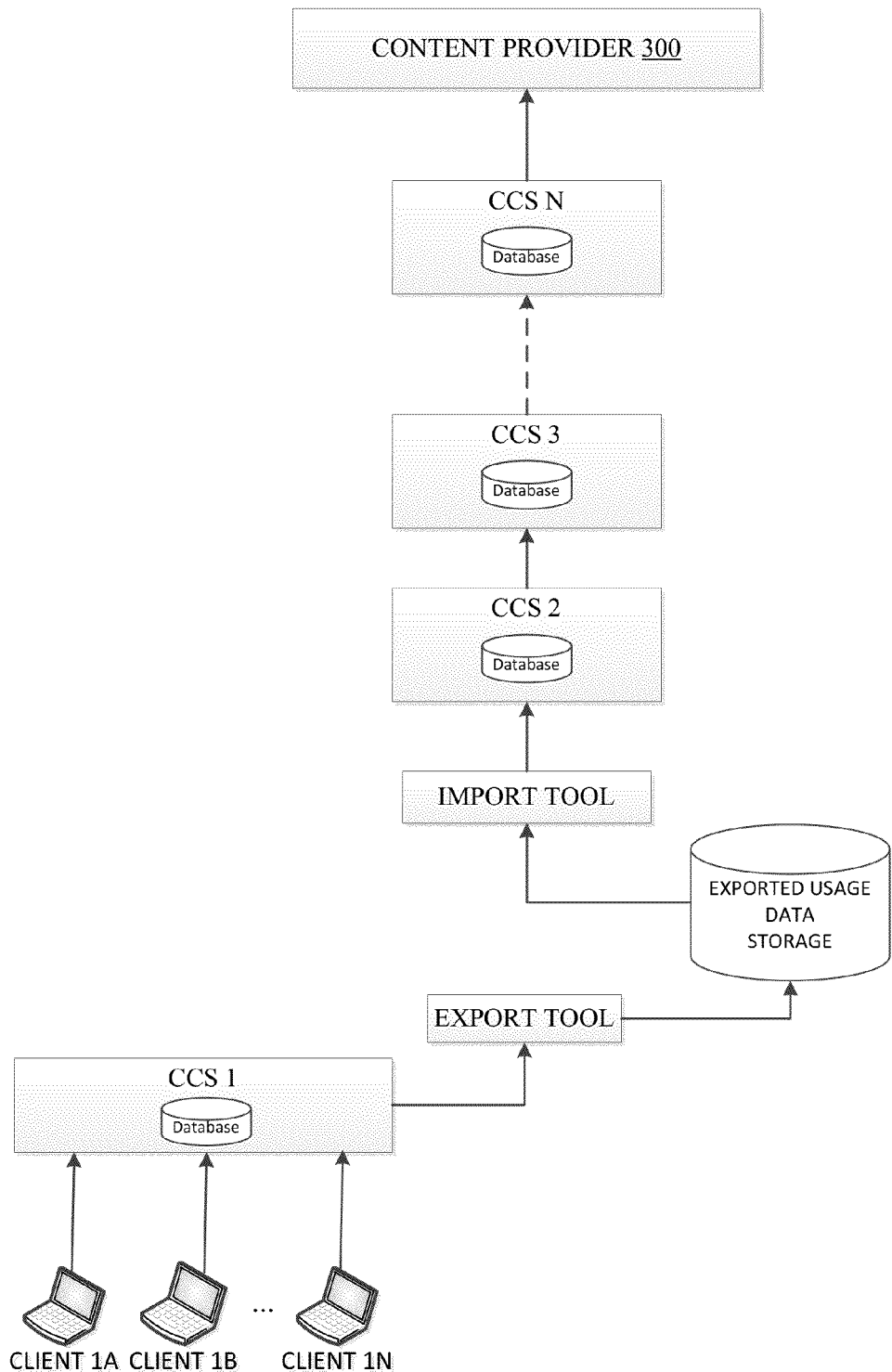
FIG. 3 is a block diagram illustrating an example certificate checkin service, according to aspects of the present disclosure.

FIG. 3 illustrates an implementation according to the present disclosure wherein a CCS (e.g., CCS 1 in FIG. 3) is configured to run in a "disconnected mode". In disconnected mode, the CCS does not have a configured parent CCS. For example, a CCS may be operated in disconnected mode if a cloud provider installing the CCS does not wish to directly report data back to the cloud provider for security reasons, or if no network connection exists to connect the CCS to a parent CCS, or an air gap exists in the network (e.g., if the CCS is installed on a submarine). The CCS running in disconnected mode includes a database configured to store and archive all usage data collected from the associated consumers (e.g., Client 1A, Client 1B, . . . and/or Client 1N of FIG. 3).

As shown in FIG. 3, an export tool (e.g., a computer program) may be employed in order to collect (i.e., export) the usage data from the CCS running in disconnected mode. In an implementation, the usage data exported by the export tool may be stored by an external storage device (referred to as the export usage data storage), such as a flash memory stick, a USB memory stick, an external hard drive, etc. As shown in FIG. 3, an import tool (e.g., a computer program) may be employed to import the usage data from the exported usage data storage. In an implementation, the export tool and the import tool may employ the same REST APIs the synchronization tasks employ in a CCS in the connected mode illustrated in FIG. 1.

For example, the import tool may be employed in a network including an "air gap", wherein one or more servers are physically isolated from another serer that tracks consumption data. According to an aspect of the present disclosure, the import tool may read the exported data via the REST interface on a downstream CCS and replay the data on another CCS via REST calls.

The import tool may then provide the usage data to a CCS in the connected mode (e.g., CCS 2 in FIG. 3) for further upstream propagation to configured parent CCSs for ultimate delivery to the content provider 300.

Figure 4:
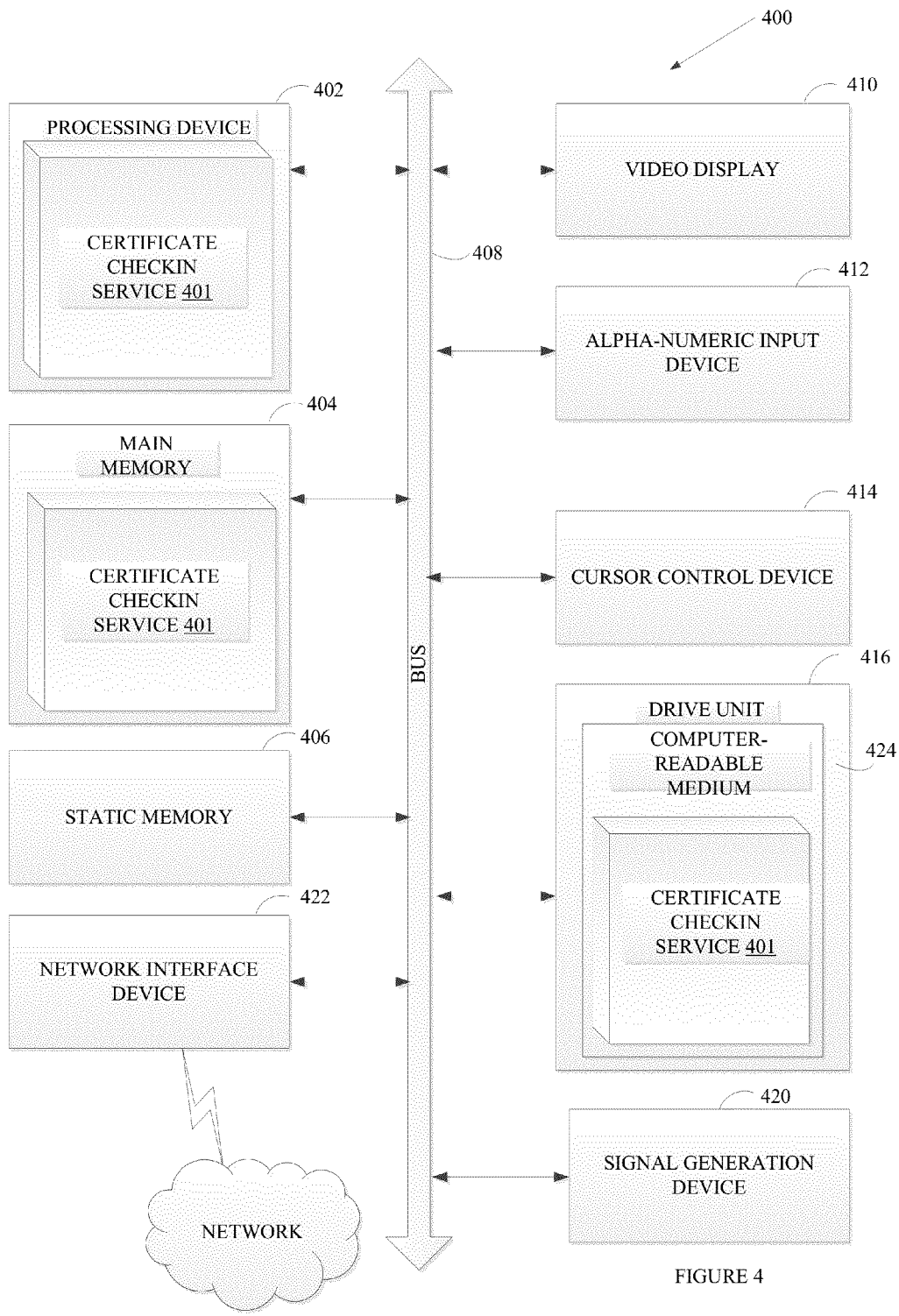
FIG. 4 illustrates a diagrammatic representation of a certification checkin service system, according to aspects of the present disclosure.

FIG. 4 illustrates an example computer system including a certificate checkin service 401 configured to perform any one or more of the methodologies discussed herein. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. According to an aspect of the present disclosure, due to the segmented and distributed architecture of the business process engine, the illustrative computer system 400 may be composed of multiple different computer systems configured to execute certificate checkin service 401.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 (e.g., a processor) represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the certificate checkin service 401 to perform the operations discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 for storing instructions associated with the certificate checkin service 401 (e.g., instructions corresponding to the methods of FIGS. 2-4 embodying any one or more of the methodologies or functions described herein. The instructions of the certificate checkin service 401 may also reside, completely or at least partially, within the main memory 404 and/or within the processing device 402 during execution thereof by the computer system 400, the main memory 404 and the processor 402 also constituting computer-readable media. Instructions 401 may further be transmitted or received over a network via the network interface device 422.

While the computer-readable storage medium 424 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "providing", "storing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device executing a first certificate checkin service (CCS), a first set of usage data relating to content of a content provider consumed by a client of a cloud provider network;
   aggregating, by the first CCS, the first set of usage data with a plurality of additional sets of usage data received from a plurality of downstream CCSs to form an aggregated set of usage data;
   providing the aggregated set of usage data to a parent CCS for provisioning to a plurality of upstream parent CCSs for delivery of the aggregated set of usage data to the content provider;
   providing, by the first CCS to the parent CCS, a request for entitlement data relating to the cloud provider network;
   receiving, via each of the plurality of upstream parent CCSs, the entitlement data from the content provider;
   storing, by the first CCS, the entitlement data; and
   determining, by the processing device executing the first CCS, if the client is entitled to consume the content in view of the entitlement data.

2. The method of claim 1, further comprising providing, by the parent CCS, the first set of usage data to a communicatively coupled upstream CCS.

3. The method of claim 1, wherein the first CCS manages a plurality of clients within a network segment of the cloud provider network.

4. The method of claim 1, wherein the first CCS receives a second set of usage data from a communicatively coupled child CCS, the second set of usage data relating to content of the content provider consumed by another client of a cloud provider network.

5. The method of claim 1, wherein the content provider manages compliance of an agreement governing consumption of the content by the cloud provider network in view of the first set of usage data.

6. The method of claim 1, wherein the plurality of upstream parent CCSs comprises a main cloud provider CCS coupled to the content provider for the final delivery of the aggregated set of usage data.

7. A non-transitory computer readable storage medium comprising instructions that, when executed by a processing device, cause the processing device to:
   receive, by the processing device executing a first certificate checkin service (CCS), a first set of usage data relating to content of a content provider consumed by a client of a cloud provider network;
   aggregate, by the first CCS, the first set of usage data with a plurality of additional sets of usage data received from a plurality of downstream CCSs to form an aggregated set of usage data;
   provide the aggregated set of usage data to a parent CCS for provisioning to a plurality of upstream parent CCSs for delivery of the aggregated set of usage data to the content provider;
   provide, by the processing device to the parent CCS, a request for entitlement data relating to the cloud provider network;
   receive, via each of the plurality of upstream parent CCSs, the entitlement data from the content provider;
   store, by the processing device, the entitlement data; and
   determine, by the processing device, if the client is entitled to consume the content in view of the entitlement data.

8. The non-transitory computer readable medium of claim 7, the parent CCS to provide the first set of usage data to a communicatively coupled upstream CCS.

9. The non-transitory computer readable medium of claim 7, the processing device to manage a plurality of clients within a network segment of the cloud provider network.

10. The non-transitory computer readable medium of claim 7, the processing device to receive a second set of usage data from a communicatively coupled child CCS, the second set of usage data relating to content of the content provider consumed by another client of a cloud provider network.

11. The non-transitory computer readable medium of claim 7, the processing device to manage compliance of an agreement governing consumption of the content by the cloud provider network in view of the first set of usage data.

12. The non-transitory computer readable medium of claim 7, wherein the plurality of upstream parent CCSs comprises a main cloud provider CCS coupled to the content provider for the final delivery of the aggregated set of usage data.

13. A system comprising:
   a memory to store instructions; and
   a processing device operatively coupled to the memory, the processing device to execute the instructions to:
   receive, by a first certificate checkin service (CCS) executed by the processing device, a first set of usage data relating to content of a content provider consumed by a client of a cloud provider network;
   aggregate, by the first CCS, the first set of usage data with a plurality of additional sets of usage data received from a plurality of downstream CCSs to form an aggregated set of usage data;

provide the aggregated set of usage data to a parent CCS for provisioning to a plurality of upstream parent CCSs for delivery of the aggregated set of usage data to the content provider;

provide, by the first CCS to the parent CCS, a request for entitlement data relating to the cloud provider network;

receive, via each of the plurality of upstream parent CCSs, the entitlement data from the content provider;

store, by the first CCS, the entitlement data received from the parent CCS; and determine, by the first CCS, if the client is entitled to consume the content in view of the entitlement data.

14. The system of claim 13, the parent CCS to provide the first set of usage data to a communicatively coupled upstream CCS.

15. The system of claim 13, wherein the processing device to execute the first CCS to manage a plurality of clients within a network segment of the cloud provider network.

16. The system of claim 13, wherein the processing device receives a second set of usage data from a communicatively coupled child CCS, the second set of usage data relating to content of the content provider consumed by another client of a cloud provider network.

17. The system of claim 13, wherein the content provider manages compliance of an agreement governing consumption of the content by the cloud provider network in view of the first set of usage data.

* * * * *